(12) United States Patent
Franke-Maintz

(10) Patent No.: US 9,764,508 B2
(45) Date of Patent: Sep. 19, 2017

(54) METHOD FOR PRODUCING HOLLOW BODIES FROM THERMOPLASTIC MATERIAL AND APPARATUS FOR CARRYING OUT THE METHOD

(71) Applicant: Kautex Textron GmbH & Co. KG, Bonn (DE)

(72) Inventor: Matthias Franke-Maintz, Hennef (DE)

(73) Assignee: Kautex Textron GmbH & Co. KG, Bonn (DE)

(*) Notice: Subject to any disclaimer, the term of this patent is extended or adjusted under 35 U.S.C. 154(b) by 326 days.

(21) Appl. No.: 14/388,977

(22) PCT Filed: Mar. 14, 2013

(86) PCT No.: PCT/EP2013/000759
§ 371 (c)(1),
(2) Date: Sep. 29, 2014

(87) PCT Pub. No.: WO2013/152824
PCT Pub. Date: Oct. 17, 2013

(65) Prior Publication Data
US 2015/0084244 A1    Mar. 26, 2015

(30) Foreign Application Priority Data
Mar. 27, 2012    (DE) .................. 10 2012 006 043

(51) Int. Cl.
*B29C 49/42*    (2006.01)
*B29C 49/00*    (2006.01)
(Continued)

(52) U.S. Cl.
CPC ...... *B29C 49/4205* (2013.01); *B29C 49/0047* (2013.01); *B29C 49/04* (2013.01);
(Continued)

(58) Field of Classification Search
None
See application file for complete search history.

(56) References Cited

U.S. PATENT DOCUMENTS

| 6,866,812 B2 | 3/2005 | Van Schaftingen et al. |
| 8,470,235 B2 | 6/2013 | Criel et al. |

(Continued)

FOREIGN PATENT DOCUMENTS

| CA | 2641463 A1 | 8/2007 |
| DE | 102006042065 A1 | 3/2008 |

(Continued)

OTHER PUBLICATIONS

English language PCT International Search Report and Written Opinion mailed Aug. 6, 2013, received in PCT Application No. PCT/EP13/00759, 13 pgs.

(Continued)

*Primary Examiner* — Monica Huson
(74) *Attorney, Agent, or Firm* — Grossman Tucker Perreault & Pfleger, PLLC

(57) ABSTRACT

The invention relates to a method for producing hollow bodies from thermoplastic material and to an apparatus for carrying out the method. The method comprises the molding of at least two sheet-like preforms in web form of thermoplastic material into two complementary shells in a multi-part tool, which in a closed position forms a mold impression, and the joining together of the shells to form an essentially closed hollow body, the preforms being brought between the parts of the tool in an opened receiving position of the parts of the tool and the preforms being placed into the part-cavities by applying differential pressure and being at least partially molded in them into shells. The shells are joined together to form an essentially closed hollow body by closing the tool to form a closed mold impression. The method is distinguished by the fact that the preforms are (Continued)

Figure 1:
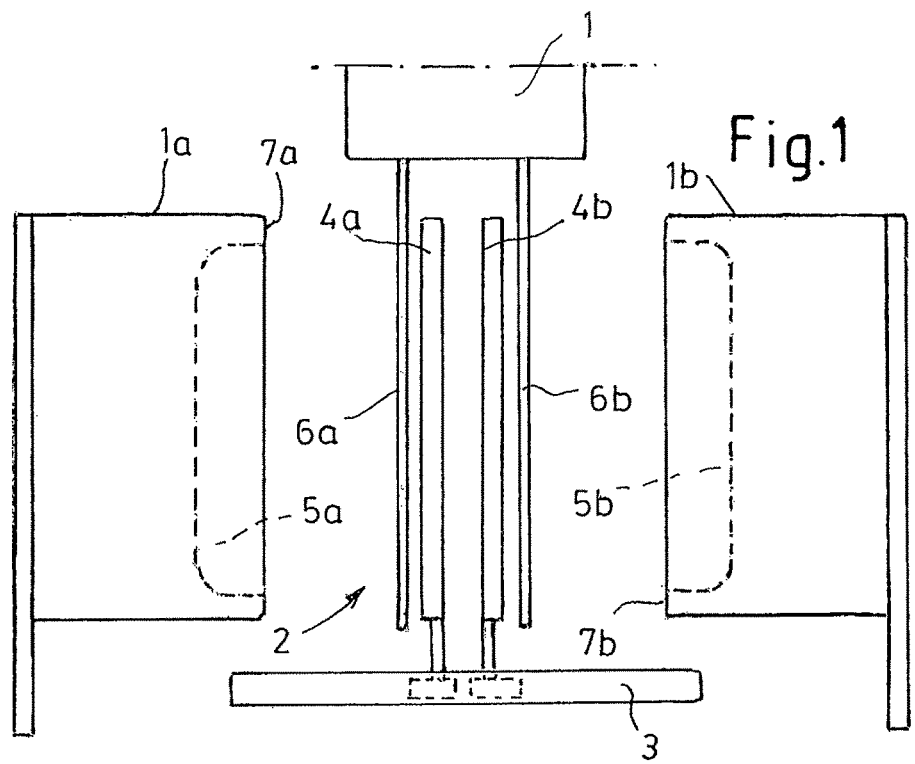

molded in the part-cavities while the parts of the tool are located in the opened receiving position.

25 Claims, 10 Drawing Sheets

(51) Int. Cl.
*B29C 49/04* (2006.01)
*B29C 49/20* (2006.01)
B29L 31/00 (2006.01)
B29K 23/00 (2006.01)
B29C 49/22 (2006.01)
B29C 51/12 (2006.01)
B29C 51/26 (2006.01)
B29K 101/12 (2006.01)
B29K 105/00 (2006.01)
B29L 22/00 (2006.01)

(52) U.S. Cl.
CPC .............. *B29C 49/20* (2013.01); *B29C 49/22* (2013.01); *B29C 51/12* (2013.01); *B29C 51/267* (2013.01); *B29C 2049/0057* (2013.01); *B29C 2049/048* (2013.01); *B29C 2049/2008* (2013.01); *B29C 2049/2073* (2013.01); *B29C 2049/2078* (2013.01); *B29C 2049/4221* (2013.01); *B29C 2791/006* (2013.01); *B29C 2791/007* (2013.01); *B29C 2793/0081* (2013.01); *B29K 2023/065* (2013.01); *B29K 2023/086* (2013.01); *B29K 2101/12* (2013.01); *B29K 2105/256* (2013.01); *B29K 2995/0067* (2013.01); *B29K 2995/0069* (2013.01); *B29L 2022/00* (2013.01); *B29L 2031/7172* (2013.01)

(56) References Cited

U.S. PATENT DOCUMENTS

| 8,603,280 | B2 | 12/2013 | Borchert et al. |
| 8,609,015 | B2 | 12/2013 | Sumi et al. |
| 2009/0309270 | A1 | 12/2009 | Buchholz et al. |
| 2011/0315308 | A1 | 12/2011 | Borchert et al. |
| 2012/0013048 | A1 | 1/2012 | Bienhuls et al. |

FOREIGN PATENT DOCUMENTS

| EP | 0618062 A2 | 10/1994 |
| JP | S61228929 A | 10/1986 |
| WO | 9964221 A1 | 12/1999 |

OTHER PUBLICATIONS

English language PCT International Preliminary Report on Patentability mailed Jul. 11, 2014, received in corresponding PCT Application No. PCT/EP13/00759, 26 pgs.

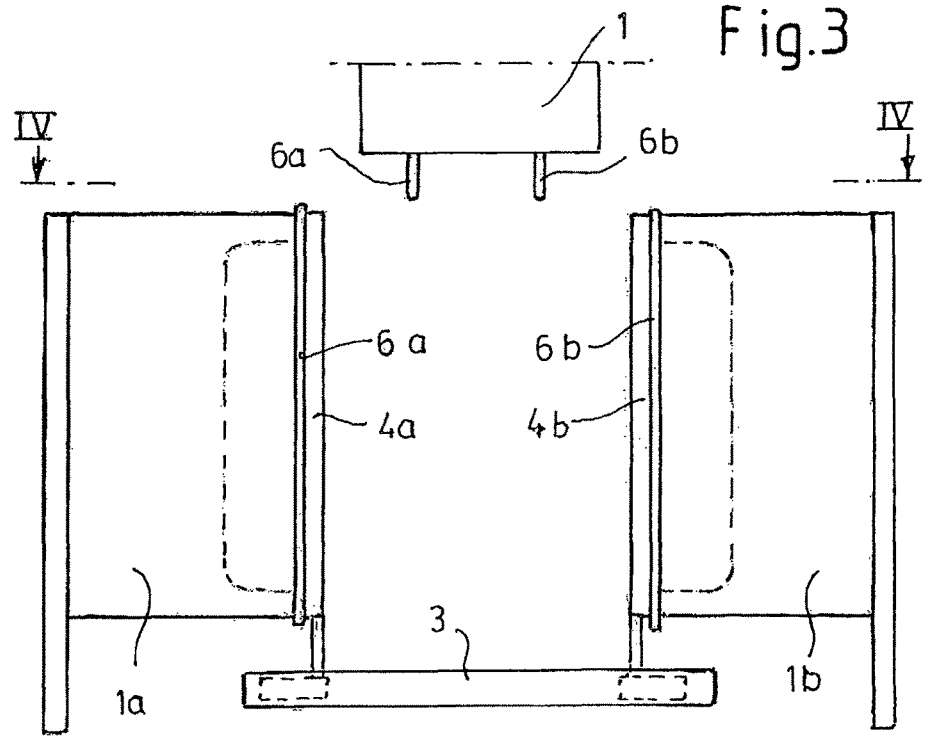
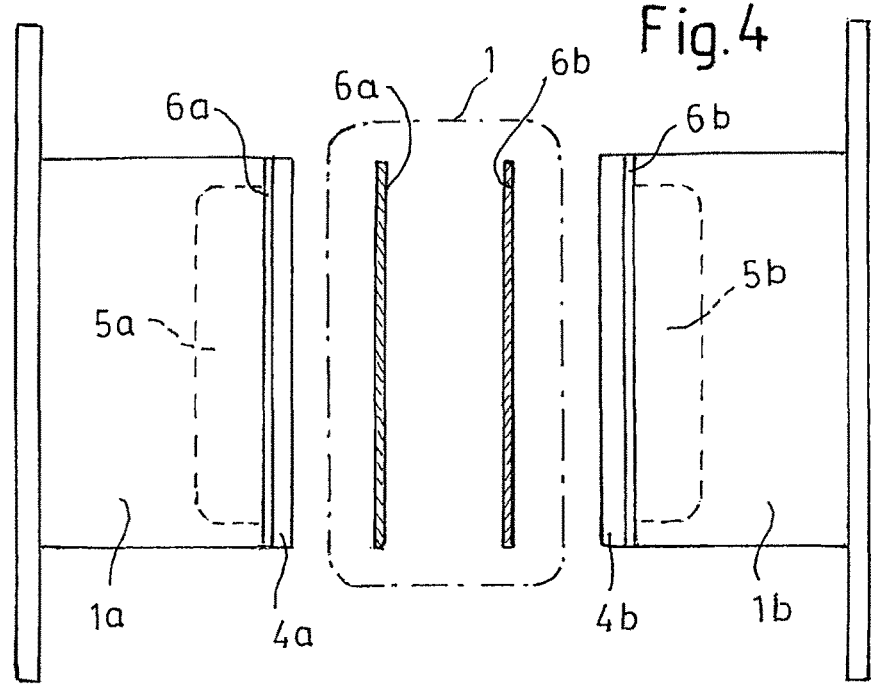

METHOD FOR PRODUCING HOLLOW BODIES FROM THERMOPLASTIC MATERIAL AND APPARATUS FOR CARRYING OUT THE METHOD

The invention relates to a method for producing hollow bodies from thermoplastic material, comprising the molding of at least two sheet-like preforms in web form of thermoplastic material in a multi-part tool, which in a closed position forms a mold impression, into two complementary shells and the joining together of the shells to form an essentially closed hollow body, the preforms being brought between the parts of the tool in an opened receiving position of the parts of the tool and the preforms being placed into the part-cavities by applying differential pressure and being at least partially molded in them into shells, and the shells being joined together to form an essentially closed hollow body by closing the tool to form a closed mold impression.

The invention also relates to an apparatus for carrying out the method.

A method of the type mentioned at the beginning is known for example from DE 10 2010 025 006 A1.

In the extrusion blow molding of plastic products, use is often made of molding tools which comprise two blow-mold halves, which are formed so as to complement one another and together bound a mold impression or cavity. Each of the blow-mold halves comprises part-cavities, which define a part of the contour of the finished hollow body. A thermoplastic extrudate in the form of a tube or parison or in the form of sheets or webs or other sheet-like products is brought between the opened halves of the tool. The tool or the blow-mold halves of the tool close(s) around the preforms, the preforms then being brought to bear against the inner wall of the part-cavities formed by the tool by means of differential pressure, so that the finished article has an outer shape that corresponds to the internal contour of the molding tool. The re-shaping of the preforms within the part-cavities of the tool takes place either by expanding the preforms by means of gas pressure and/or bringing the preforms to bear against the inner wall of the tool by means of negative pressure, which is applied by means of channels in the mold wall of the tool.

In the production of relatively complex technical components, such as for example fuel tanks, it is often necessary to attach various inserts in the hollow body to be produced. There are a wide variety of different ways in which these inserts can already be introduced into the hollow body during the production thereof, which obviates the need for inserts to be mounted later through openings provided in the hollow body after the production thereof and allows the tank or hollow body to be produced in one operation.

In the case of the production of hollow bodies by means of the classic extrusion blow molding, in which an extrudate in the form of a closed parison is brought between the opened halves of the tool and the parison is expanded within the closed tool to form a finished hollow body, the introduction of the inserts may be performed for example by so-called "blow-molding encapsulation" during production. In this case, the components to be introduced are inserted into the parison by means of an appropriately formed holding device before the expansion of the parison within the closed tool and are attached to the wall of the cavity within the tool when the preforms are brought to bear against said wall, if appropriate with the assistance of further movable components, for example slides. Such a method is relatively complex and limited with respect to the later position and number of inserts in the finished tank.

In addition, the production of fuel tanks by the extrusion blow molding of tubular extrudates makes a certain amount of finishing work necessary. Certain inserts must be attached in the tank after it has been completed. Some of these internal, or at least partially internal, accessories/inserts that have to be placed and/or attached in the tank after completion require separate operations, which are time-consuming and expensive.

Methods for producing fuel tanks that have become established in this connection are methods in which a number of sheet-like preforms in web form of plasticated thermoplastic material are re-shaped/molded in a multi-part tool forming a mold impression and having two outer molds and a core, which perform an opening and closing movement in relation to one another, the core being used for attaching inserts to the inner wall of the hollow body to be produced. For this purpose, the tools are first closed around the core. Inserts are attached to the preform in a given layout by means of the core. The core is removed between the blow-mold halves, and the blow-mold halves are then closed once again in order to finish the blow-molding of the fuel tank.

Such a method is known for example from WO 2007/088200 A1. A similar method is also known from U.S. Pat. No. 6,866,812 B2. The tools used for carrying out this method are complex particularly because the previously mentioned known methods rely on the proven, available extrusion technique from classic extrusion blow molding, in which a multi-layer parison is extruded.

In U.S. Pat. No. 6,866,812 B2, it is proposed in this respect for example to divide or separate an extruded tubular preform at diametrically opposite points into sheet-like preforms in web form and to bring these preforms in web form between the opened parts of the tool, to be precise by continuous extrusion in the direction of gravitational force above the tool. This technique is preferred because it is possible to rely on existing extruders and extrusion heads, which offer relatively simple possibilities for the wall thickness control of the extrudates. As a result, the investment expenditure for the tools and devices required for the production of the hollow bodies is kept within limits, but at the cost of the disadvantage that the arrangement, procedure and design of the tool are dictated by the production of the tubular extrudate.

Thus, here it is provided for example in U.S. Pat. No. 6,866,812 B2 to guide the preforms by means of complexly constructed roller conveyors, in order to keep them at a distance from one another between the opened parts of the tool. The core used for introducing inserts must have a relatively great overall depth, which ultimately predetermines the minimum distance between the preforms in web form to be guided along away from one another.

This makes the configuration of the core or the central tool relatively complex.

The central tool must be of such a design that, in addition to possibly hydraulically or pneumatically retractable and extendable component holders, it has heating devices, rams or the like. In addition, reliable sealing of the cavity of the tool must be ensured during the preliminary molding/molding of the preforms into shells. At the same time, the central tool must withstand the clamping pressure of the blow-mold halves, since, during the re-shaping and molding of the preforms into half-shells, a blowing pressure of at least 5 bar generally has to be applied in a first step. As a result, the required central tool or the required core becomes relatively expensive, because it has to be made entirely to tool quality.

Therefore, DE 10 2010 025 006 proposes a method for producing hollow bodies from thermoplastic material comprising the molding of at least two sheet-like preforms in web form of plasticated thermoplastic material in a multi-part tool, forming a cavity, into two complementary shells to form an essentially closed hollow body, the preforms being brought between opened parts of the mold respectively having part-cavities, the parts of the tool then being closed against tool parts arranged between the preforms and the preforms being placed into the part-cavities while differential pressure is applied and molded. In a separate method step, the tools are opened again and inserts of the hollow body to be produced are attached to the shells. Finally, the shells are joined together to form a closed hollow body by renewed closing of the tools.

This method has the advantage in particular that the molding of the shells merely requires a simple tool divider, which only has to perform a sealing function. The overall depth of the tool divider can be set independently of the position and arrangement of the inserts to be introduced into the hollow body, so that it is no longer necessary to guide preforms in sheet or web form extruded under gravitational force above the tools.

Restrictions of this method can be seen as before in the fact that the tools have to perform relatively many opening and closing movements to complete a production cycle. Firstly, the tools are closed against the tool divider. Then the molding of the shells takes place, the tools are opened again, the tool divider is moved out of the tool, and then a previously loaded component carrier is displaced between the tools, and the tools are closed again against the component carrier. After joining the inserts, the tools are opened once again and the component carrier/central frame is moved out from the tools. The latter are then moved together again for the joining of the shells and final blow molding of the hollow body and opened for the removal of the article.

DE 10 2010 026 716 A1 discloses a blow molding tool for producing a plastic article, comprising at least one clamping frame with mold clamping devices and at least two blow mold halves, which are formed such that they can be moved together and apart by means of an opening and closing movement of the clamping frame and which respectively have at least one cavity for the forming of the plastic article. Thereby, the mold clamping devices respectively have at least one tool holder, in which a mold insert is in each case exchangeably inserted, and in that the tool holders respectively form a peripheral sealing edge. The blow molding tool furthermore comprises a central tool, which can be moved transversely in relation to the opening and closing movement of the blow mold halves and which can be brought into sealing contact with the sealing edges of the tool holders.

DE 10 2010 026 716 A1 discloses furthermore, that the central frame can be provided peripherally with respectively retractable and extendable frames, which in each case form retractable and extendable sealing edges. Before the preforms are brought into contact with the cavities by applying negative pressure, the tool holders are first closed against the extended frames.

EP 2 399 722 A2 discloses a method for producing hollow bodies from thermoplastic material, comprising the molding of at least two sheet-like, web-shaped preforms of plasticated thermoplastic material in a multi-part tool forming a cavity to form two complementary shells, and also the joining together of the shells to form a substantially closed hollow body, wherein the preforms are brought between open parts of the tool which each have part-cavities, the parts of the tool are then closed against a tool separator arranged between the preforms, and the preforms are inserted into the part-cavities with the use of differential pressure and molded. In a further separate method step the tools are reopened and internal components of the hollow body to be produced are fastened to at least one of the shells, and finally the shells are joined together by reclosing the tools to form a closed hollow body. EP 2 399 722 A2 therefore discloses, that the parts of the tool are closed against the tool separator arranged between the preforms before the preforms are inserted into the part-cavities with use of differential pressure.

US 2009/0309270 A1 discloses a method for producing hollow bodies from thermoplastic material in which web- or strip-type preforms of plasticized material are shaped in a multi-part tool which forms a mold nest comprising two outer moulds and a central mould which perform opening and closing movements with respect to one another. In a first process step the outer moulds are moved or closed in the direction of the x-axis against the central mould. The still warm-plastic extrudate, or the still-warm plastic preforms, are expanded by exertion of differential pressure inside the mould nest defined by the outer moulds inside the cavity formed by the outer moulds.

DE 10 2006 006 469 A1 discloses a process for the production of an article enclosing installation parts in the form of a hollow body of thermoplastic material, in which one or more preforms in web or tube form of plasticized plastic material are disposed between the open parts of a molding tool forming a cavity. At least one installation part to be enclosed by the finished article is placed between the parts of the molding tool and the tool is closed around the preforms and the installation part and the preforms acquire the external configuration of the article within the cavity enclosed by the tool.

Although the known method has been improved with regard to simplifying the central tool, it still requires a relatively great cycle time for the production of a hollow body.

For the purposes of the present application, a cycle refers to the entire time from when the preforms are brought into the tool until the next time that preforms are again received by the tool.

The previously mentioned methods known from the prior art for processing preforms in web form are also at a disadvantage with regard to the cycle times in comparison with the classic method of extrusion blow molding from the undivided parison.

WO 2007/088200 is already based on the recognition that, in the case of a method using a core, the cycle time is prolonged, since it is first necessary to load the core with relevant accessories, which may have to be preheated, then to introduce the core provided with components into the molding tool, in order then to attach them, and finally to remove the core in order to be able to close the molding tool and carry out the demolding of the tank. As a solution to this, it is proposed in the document to move the core in a controlled way with a variable speed and/or with optimum stopping positions of variable duration.

However, the improvements that are achieved by this method with regard to the cycle time are not significant.

The invention is therefore based on the object of providing a method of the type mentioned at the beginning with which the cycle times are improved.

The invention is also based on the object of providing such an apparatus.

Finally, the invention is based on the object of providing a method in which the required mass movements during a production cycle are reduced.

The object on which the invention is based is achieved by a method for producing hollow bodies from thermoplastic material, comprising the molding of at least two sheet-like preforms in web form of thermoplastic material into two complementary shells in a multi-part tool, which in a closed position forms a mold impression, and the joining together of the shells to form an essentially closed hollow body, the preforms being brought between the parts of the tool in an opened receiving position of the parts of the tool and the preforms being placed into the part-cavities by applying differential pressure and being at least partially molded in them into shells, and the shells being joined together to form an essentially closed hollow body by closing the tool to form a closed mold impression, the method according to the invention being distinguished by the fact that the preforms are molded in the part-cavities while the parts of the tool are located in the opened receiving position.

The invention can be summarized by stating that the method according to the invention deviates in principle from the procedure of sealing off the parts of the tool or blow-mold halves by a closing movement against a central framework, a central frame, a tool divider or a core. Rather, in the case of the method according to the invention, the tools remain fixed in place in the opened receiving position of the tool parts or the blow-mold halves. Instead, the preforms are brought up to the opened tool parts, brought to bear and pressed against the cavity concerned while sealing it, so that inflating and/or drawing into the part-cavities of the tool is required essentially without any movement of the blow-mold halves or parts of the tool.

It follows from this that significantly less mass has to be moved and it is already possible at this stage of the method to dispense with a complete opening and closing movement of the tools. The tools are nevertheless movable in the sense of an opening and closing movement and in the sense of a displacing movement out of and into a feeding position.

For the purposes of the present invention, a preform should be understood as meaning a sheet-like product in the sense of a web or a sheet of a molten, plastic material. It may be an extrudate that has been produced in one or more layers and has preferably already been discharged as an extrudate in sheet form from a slot die. An extrusion apparatus according to the invention that is provided for this purpose may comprise an extrusion head with one or more slot dies and one or more extruders for feeding various plasticated materials.

For the purposes of the present application, the preforms of thermoplastic material preferably consist of a number of layers based on HDPE with EVOH barrier layers for hydrocarbons. A typical extrudate may for example comprise a carbon-black-pigmented outer layer based on HDPE, a recycled layer, an adhesion promoter layer, an EVOH barrier layer, a further adhesion promoter layer and a plain, translucent HDPE layer.

When the term blow-mold halves of the blow-molding tool is used hereinafter, this should not necessarily be taken to mean that the tool only consists of two parts in the sense of halves. Rather, each part of the tool may itself have a number of parts, in particular slides or other parts that are movable in relation to one another.

When reference is made hereinafter to complementary shells or complementary tool parts, this does not necessarily have to mean that the shells/part-cavities or tool parts are each identical.

The parting plane of the tool does not have to be a geometrically centrally and perpendicularly extending parting plane, as described below on the basis of the exemplary embodiment.

The provision of the preforms in web form according to the invention may take place both by cutting open a previously extruded parison at diametrically opposite points and by extrusion of preforms in web form from one or more slot dies spaced apart from one another. For this purpose, an extrusion head according to DE 10 2006 042 065 A1 may be used for example, reference to the full content of which is made here, including for the purposes of disclosure.

For the purposes of the present invention, complementary shells should be understood as meaning at least two shell-shaped components which are respectively formed matching one another in such a way that, when they are joined together or put together, the finished hollow body is obtained.

In the case of a preferred variant of the method according to the invention, it is provided that the preforms are brought to bear against the opened molding tools, covering and sealing off the part-cavities, by means of at least one feeding device. By means of such a feeding device, it is possible for example also to remove and/or detach the preforms at an extrusion head.

Preferably, the preforms are re-shaped in the still molten state, by using the heat of extrusion, in the part-cavities of the molding tools by applying positive pressure and/or by applying negative pressure. Particularly preferably, the re-shaping or molding takes place completely from the heat of extrusion, i.e. without any further heat being supplied to the preforms and without further plasticating energy being supplied.

The differential pressure required for the molding within the tools may be provided for example by means of one or more blowing pins provided in the feeding device or by means of corresponding negative-pressure channels and negative-pressure openings in porous regions of the part-cavities of the molding tools.

In the case of an advantageous variant of the method, it is provided that at least parts of the feeding device are displaced with respect to the tool for the purpose of feeding the preforms and sealing off the part-cavities.

In the receiving position of the tools, for example, the feeding device may be arranged between the parts of the tool respectively forming part-cavities. For this purpose, the feeding device may for example be arranged fixed in place in a position under an extrusion head of an extrusion device, whereas for example the parts of the tool may be formed displaceably in relation to the extrusion head and in relation to the feeding device.

Expediently, the feeding device comprises at least two pressing elements, preferably in the form of adjustable frames or plates or the like, which are respectively displaced against the parts of the tool forming the part-cavities, with a preform interposed and/or clamped in place. The pressing elements may also be formed in themselves as divided or segmented, depending on the form taken by the parting plane of the molding tool. This parting plane of the tool does not necessarily have to form a single plane, but may also be offset within itself, which requires a corresponding form of the pressing elements.

In the case of a particularly advantageous variant of the method according to the invention, after the molding of the shells, the tool is displaced from a first, feeding position into a second, joining position, to be precise preferably in the opened position, i.e. in the receiving position.

Expediently, at least one insert of the tank to be produced is attached to at least one shell when the shell is arranged within the opened tool, to be precise before the shells are joined together to form the closed hollow body. The inserts or functional components of the tank that are concerned preferably consist at least partially of a thermoplastic material that is compatible with the shell of the tank to be produced in the sense of weldability. The inserts are either welded to the still molten, plastic material of the shells by applying a corresponding joining pressure or riveted to them. Such riveting may be performed "in situ", i.e. the molten material of the shells flows through and behind corresponding openings on the inserts or the inserts are riveted to the shells by means of prefabricated riveting pins, the riveting pins being pressed into the still molten material of the shells and fusing with the material of the shells.

In any event, the inserts to be attached to the shell may have been preheated before their attachment.

The insert concerned is expediently attached to the shell concerned in the joining position of the tool, on the side of the shell facing away from the tool.

In this joining position of the tool, it may also be provided when the tool is open to push nipples and/or other connecting components through the still molten shell into a corresponding matrix or depression in the tool.

According to a further advantageous variant of the method according to the invention, it is provided that the insert is attached to the shell concerned by means of a component carrier.

The component carrier may for example be displaced and/or pivoted between a joining position and a loading position. It is particularly advantageous in the sense of an improved cycle time if the already loaded component carrier is located in the joining position when the opened tool is then likewise brought into this joining position. The joining position of the component carrier corresponds in this case approximately to the joining position of the tool, which means that the joining position of the component carrier and the joining position of the tool are devised such that, in this position, the component carrier is arranged within the opened tool.

The opened tool is expediently brought from the feeding position into the joining position, so that the already loaded component carrier is positioned between the parts of the tool. As already mentioned above, this component carrier may already be located there or may be pivoted or displaced into the corresponding position. The component carrier may alternatively also be brought into the joining position at the same time as the tool.

Expediently, in the feeding position, the tool is arranged under an extrusion head and is brought from this position into the joining position.

The method according to the present invention may likewise comprise the continuous extrusion of two preforms in web form from an extrusion head, which is arranged fixed in place above the feeding position of the tool.

Preferably, a fuel tank of thermoplastic material is produced by the method according to the invention. Inserts in this sense are for example valves, fuel pumps, fuel feed units, ventilating and venting lines, pumps, sensors or similar functional inserts of the fuel tank.

The invention also relates to an apparatus for carrying out the method, comprising a multi-part blow-molding tool with at least two blow-mold halves, which respectively form at least one part-cavity, the contour of which corresponds approximately to the contour of a shell to be molded, with at least one feeding device for bringing preforms to bear against the blow-mold halves in such a way that the preforms can be drawn into the part-cavities by means of differential pressure and can be molded in them, the apparatus being distinguished by the fact that the feeding device comprises at least two pressing elements, preferably in the form of frames or plates or clamping devices, which are arranged adjustably on or at a feeding frame, that, in a receiving position of the blow-mold halves, the feeding frame is arranged between the blow-mold halves and that the pressing elements of the feeding device are adjustable in the direction of a possible opening and closing movement of the blow-mold halves, in order to bring the preforms to bear against the blow-mold halves.

Preferably, the feeding frame is arranged fixed in place in a feeding position and the blow-mold halves are displaceable transversely in relation to an opening and closing movement and also in relation to the feeding frame.

The pressing elements may for example comprise means for receiving and/or clamping the preforms.

It may also be provided that the feeding device comprises means for removing and/or detaching the preforms from an extrusion device. For example, take-over and transfer grippers may be arranged on the feeding device.

The removal from the extrusion head and the holding and carrying along of the preforms in web form may alternatively also be performed by separate gripping devices, for example in the form of 3D manipulators.

A variant of the apparatus according to the invention comprises at least one joining device for the mounting of at least one insert of the hollow body to be produced on at least one shell.

The blow-mold halves may for example be displaceable from a feeding position into a joining position in relation to the feeding device.

The feeding frame and/or the pressing elements may be adjustable in and counter to the direction of weight or in and counter to the direction of extrusion, in order in the case of a fixed arrangement of the feeding frame under the extrusion head and in the case of continuous extrusion to make allowance for the fact that extrudate emerges continuously from the extrusion head and possibly collides with the movement of the feeding device.

In the case of an expedient and advantageous variant of the apparatus according to the invention, it is provided that the joining device comprises at least one component carrier, which is provided with at least one receptacle for an insert in each case. Simple clamping elements, which in the preloaded state can be brought into the joining position by means of pneumatic cylinders, may be provided as receptacles. Alternatively, the receptacles may be arranged rigidly on the component carrier and the joining of the inserts may then take place by means of the closing movement of the blow-mold halves.

The joining device may be displaceable and/or pivotable from a loading position into the joining position.

The apparatus according to the invention may comprise a number of prefabricated or preloaded joining devices, in order also to make allowance for an improved cycle time.

Expediently, the blow-mold halves and the feeding device as well as the joining device are arranged on a common machine frame.

Figure 2:
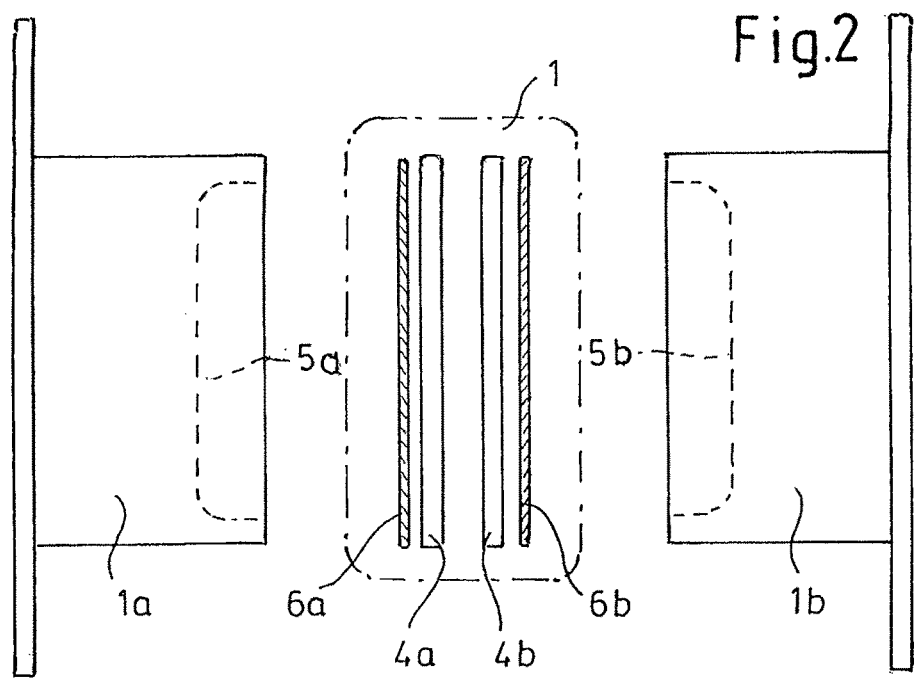
Figure 5:
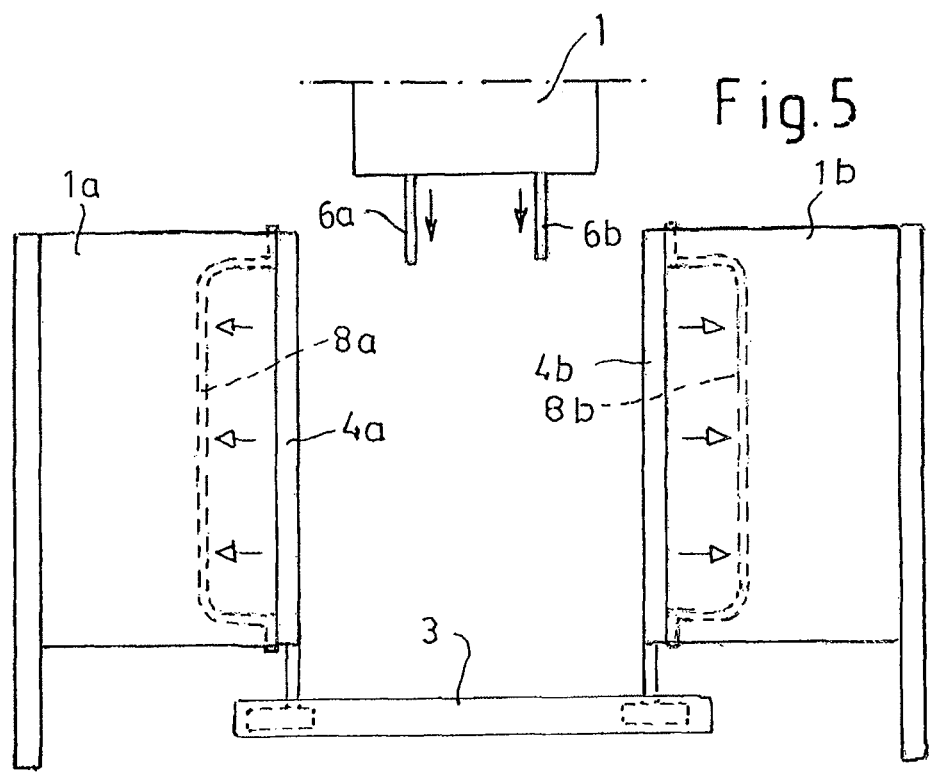
Figure 6:
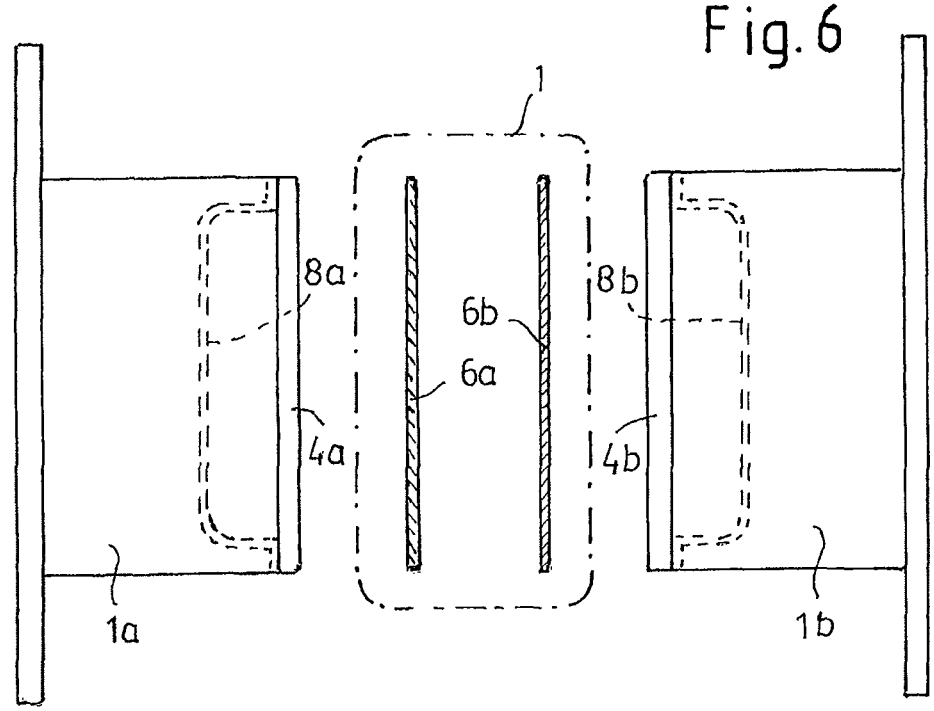
Figure 7:
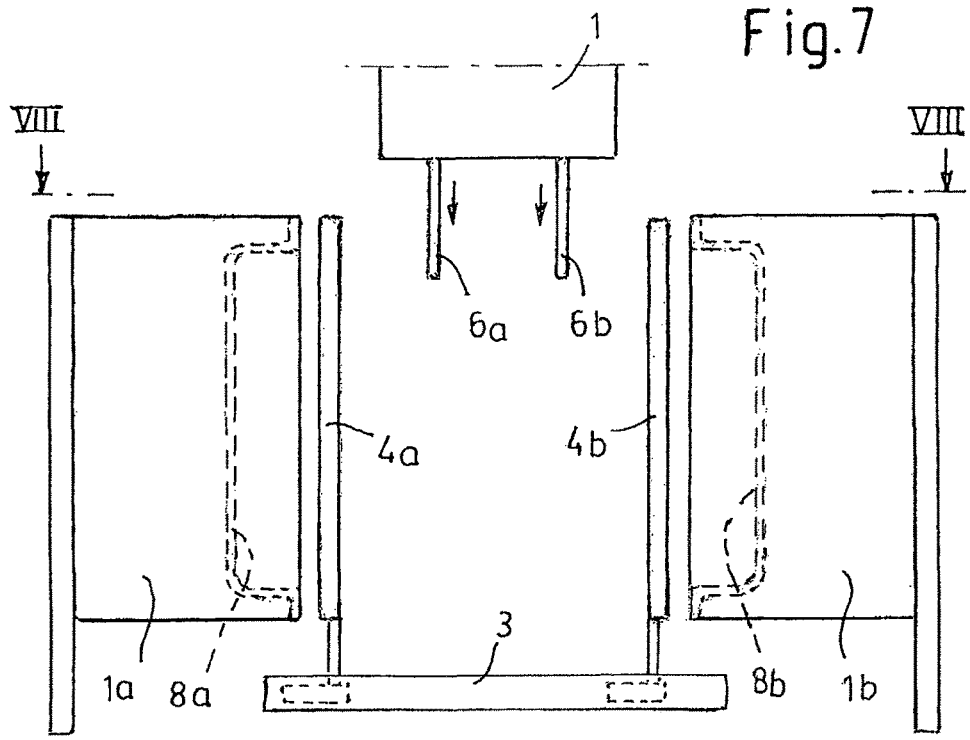
Figure 8:
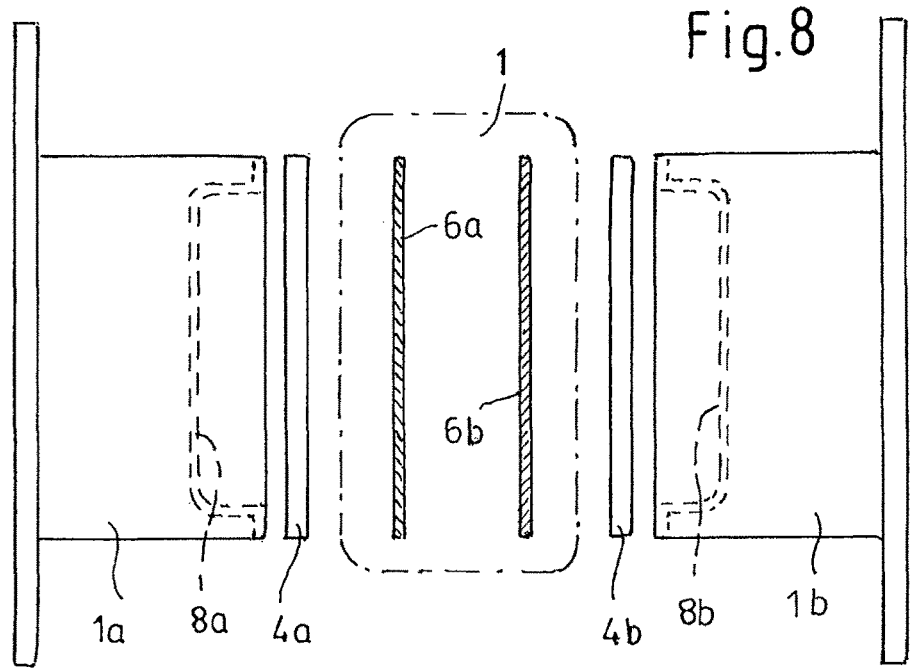
Figure 9:
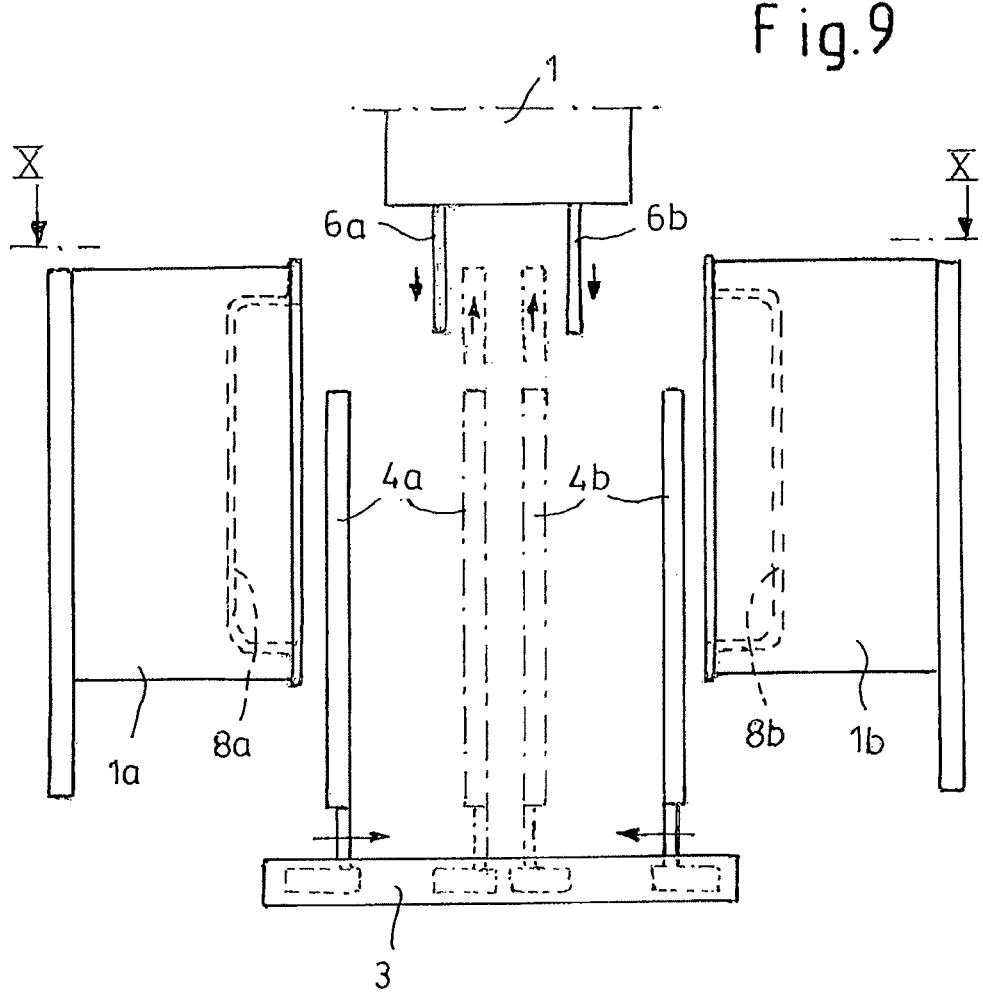
Figure 10:
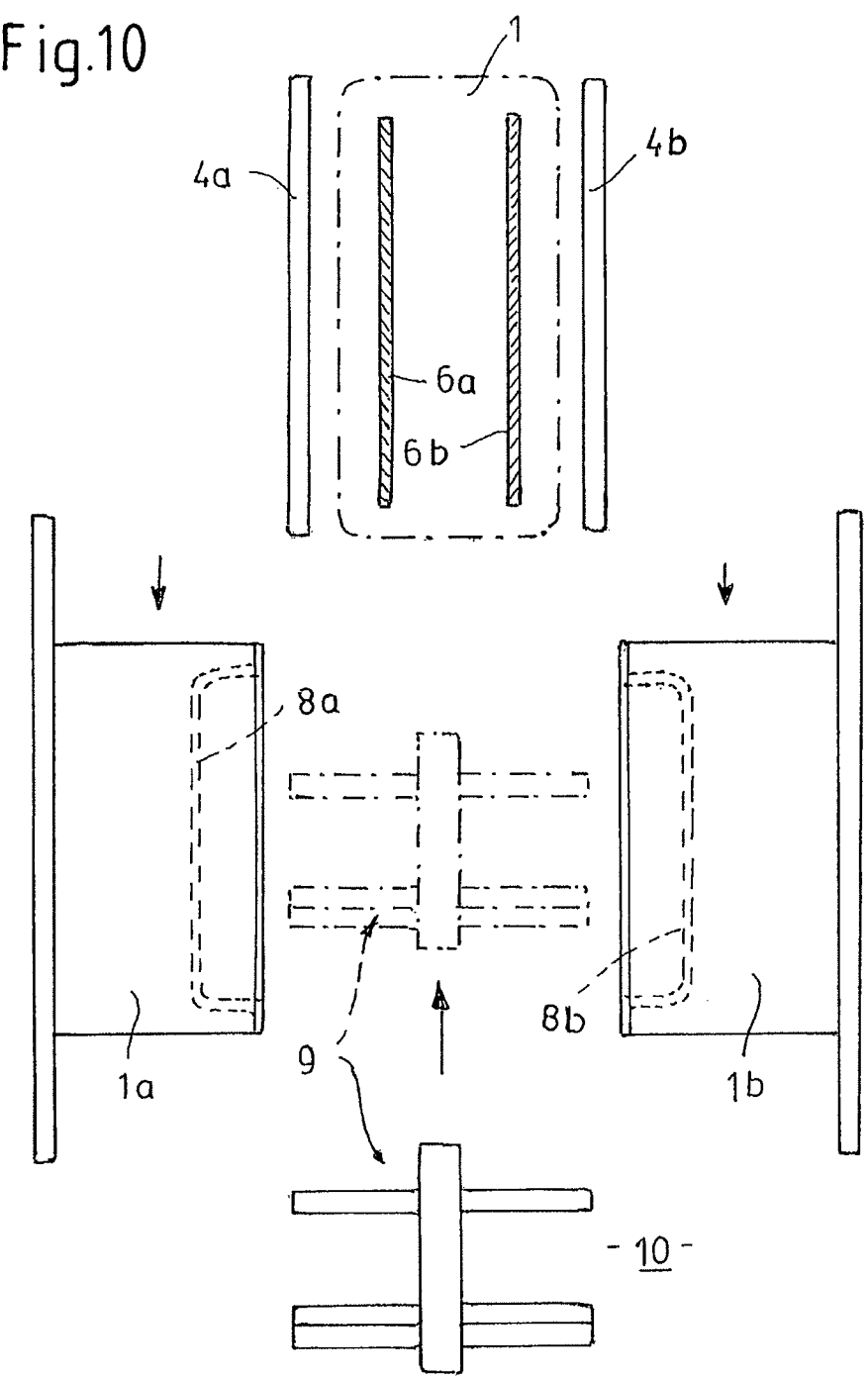
Figure 11:
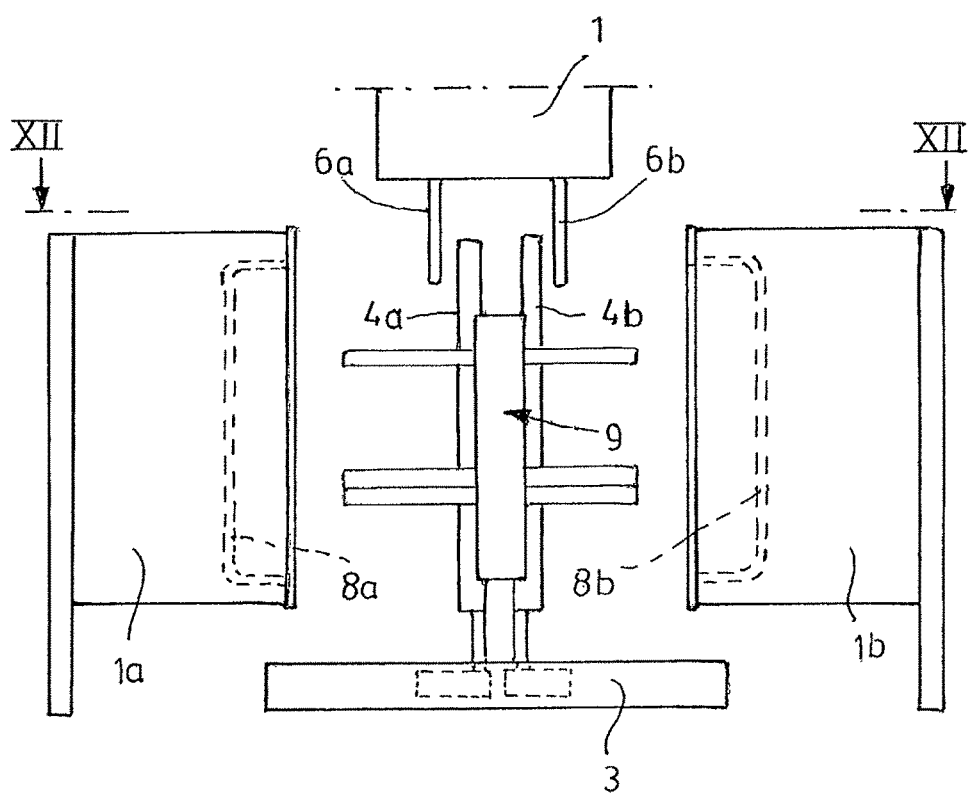
Figure 12:
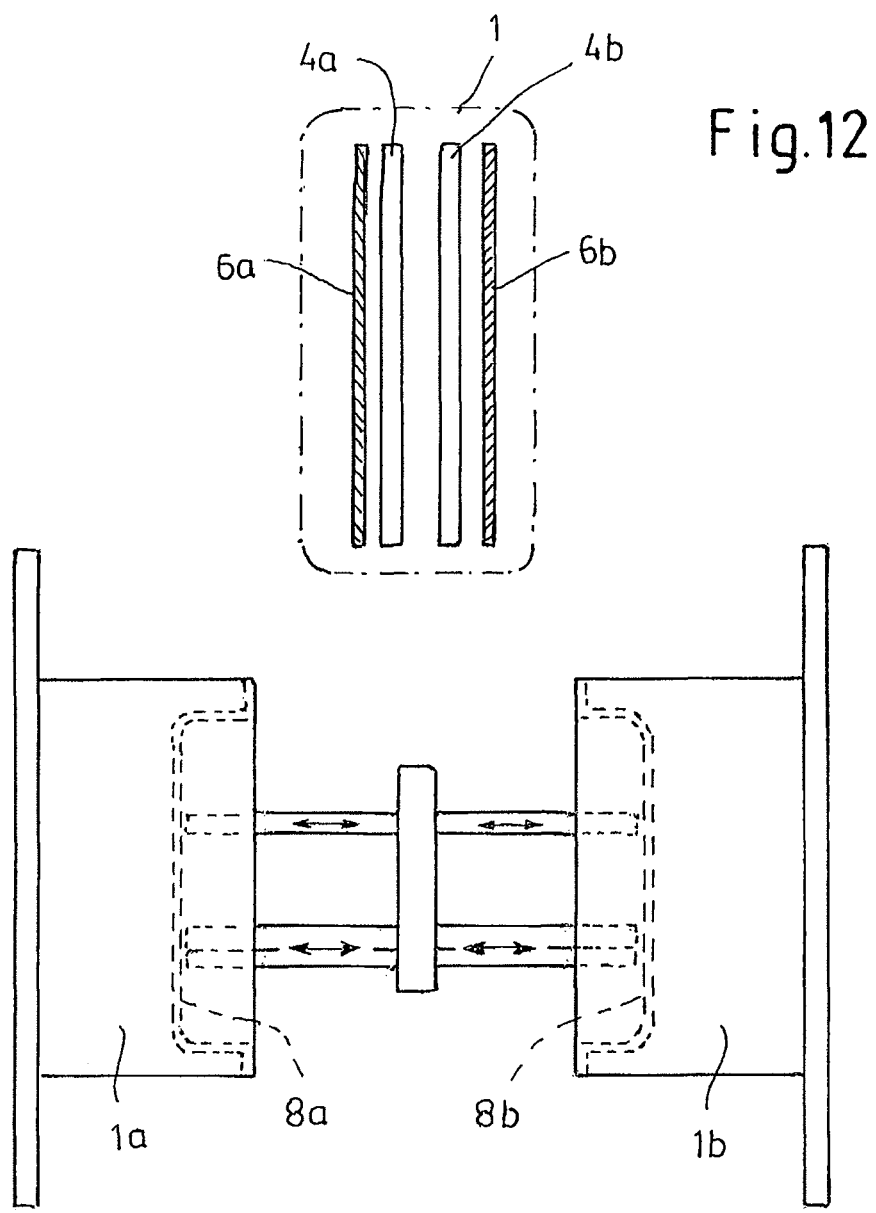
Figure 13:
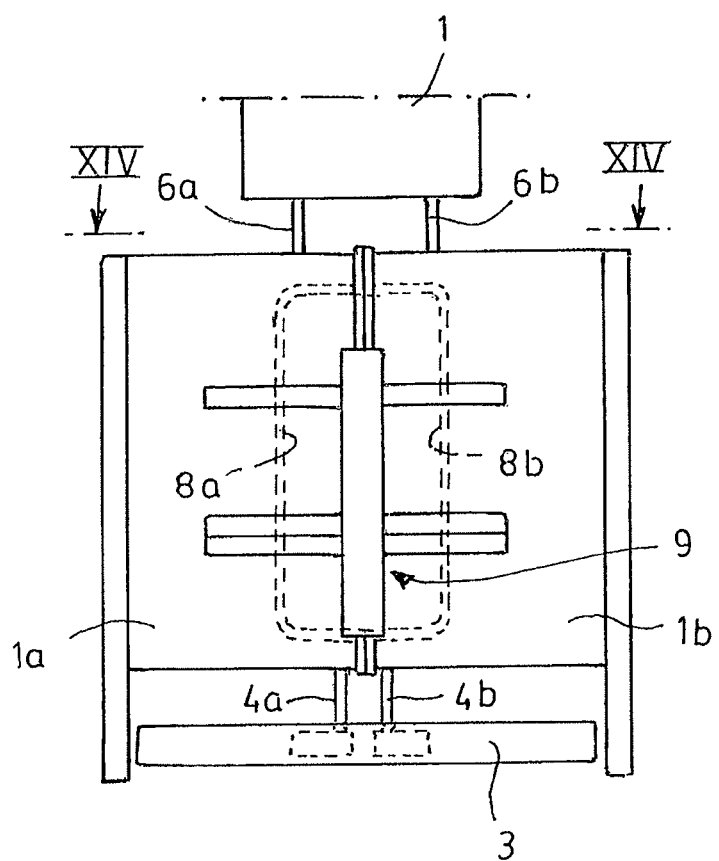
Figure 14:
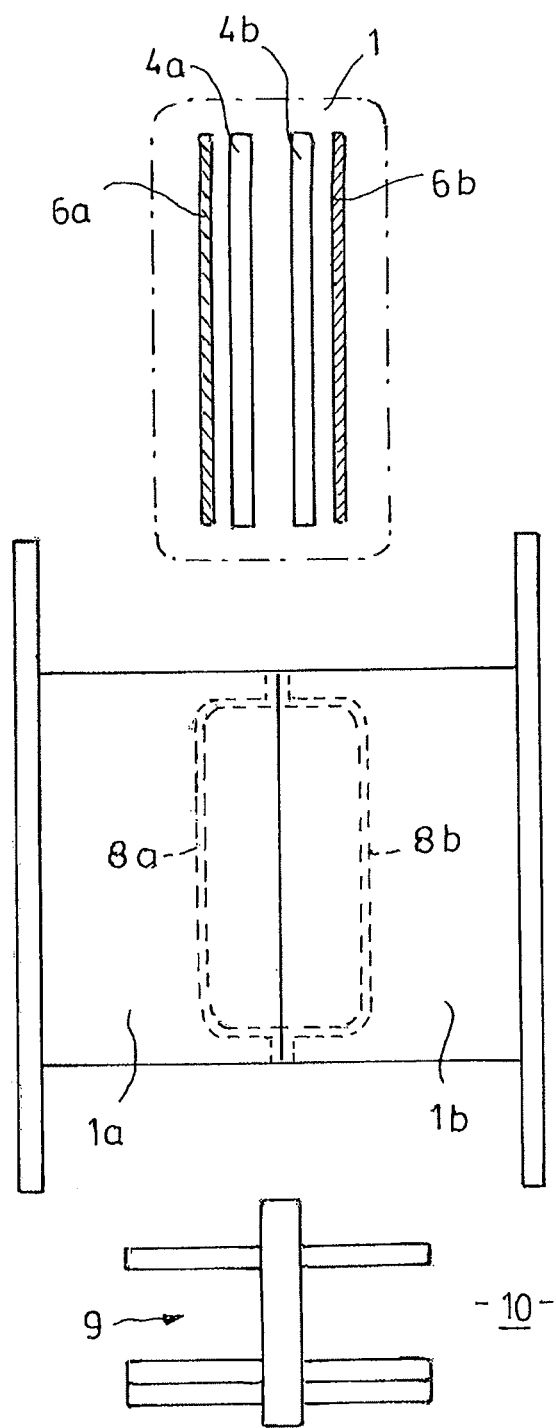

The invention is explained below with reference to the accompanying drawings, in which:

FIG. 1 shows a side view of an extrusion blow-molding device according to the invention in the joining position of the extrusion blow-molding tool, FIG. 2 shows a sectional view along the lines II-II in FIG. 1, FIG. 3 shows a view corresponding to FIG. 1, in which the pressing elements of the feeding device bring the preforms to bear against the tool parts, FIG. 4 shows a sectional view along the line IV-IV in FIG. 3, FIG. 5 shows a view corresponding to FIG. 3, which illustrates the molding of the preforms in the part-cavities, FIG. 6 shows a view along the sectional line VI-VI in FIG. 5, FIG. 7 shows a view corresponding to the previous FIGS. 1, 3 and 5, in which the pressing elements of the feeding device are partially retracted, FIG. 8 shows a section along the line VIII-VIII in FIG. 7, FIG. 9 shows a view corresponding to FIG. 7, which illustrates the movement of the feeding device or the pressing elements of the feeding device back into the starting position that is represented in FIG. 1, FIG. 10 shows a sectional view along the line X-X in FIG. 5, which illustrates the displacing movement of the blow-molding tool from a feeding position into a joining position, FIG. 11 shows a side view of the blow-molding tool in the joining position, with the joining device arranged between the parts of the blow-molding tool, FIG. 12 shows a sectional view along the lines XII-XII in FIG. 11, which illustrates the joining operation, FIG. 13 shows a view which illustrates the joining operation of the inserts by the closing operation of the blow-mold halves (static joining) and FIG. 14 shows a view corresponding to FIG. 12 during the joining together of the shells, i.e. with a closed tool in the joining position.

FIGS. 1 and 2 show a greatly simplified view of a multi-part tool as a blow-molding tool in the feeding position under an extrusion head 1. The blow-molding tool comprises the blow-mold halves 1a, 1b and a feeding device 2, which comprises sealing frames 4a, 4b arranged on a feeding frame 3. The sealing frames 4a, 4b are movable in relation to the feeding frame 3 in and counter to the closing direction of the blow-mold halves 1a, 1b. The blow-mold halves 1a, 1b are arranged in a known way on a clamping frame (not represented), by means of which they are displaceable toward one another and away from one another, from an opened position into a closed position and from a closed position into an opened position. The opened position is referred to hereinafter as the receiving position.

At least the blow-mold halves 1a, 1b or their mold platens are arranged on a common clamping frame (not represented), which clamping frame is displaceable from a position under the extrusion head 1, which is referred to hereinafter as the feeding position, into a position out of the plane of the drawing, which is referred to hereinafter as the joining position. The joining position also corresponds to the removal position, i.e. the position in which the finished extrusion-blow-molded article is removed from the blow mold or the tool. The terms "blow mold" and "tool" as well as "blow-mold halves" and "parts of the tool" are used synonymously hereinafter.

Each blow-mold half 1a, 1b comprises a part-cavity 5a, 5b, the part-cavities forming when the blow-mold halves 1a, 1b are closed a mold impression that defines the complete external contour of the article to be produced, in the present case a plastic fuel tank.

The extrusion head 1 is formed as an extrusion head with two slot dies, which are not designated any more specifically and from which sheet-like preforms 6a, 6b in web form are respectively discharged. Connected to the extrusion head are a number of extruders (not shown) for plasticating and feeding the polymer melt to the extrusion head 1. The extrusion takes place continuously, i.e. the preforms 6a, 6b emerge continuously from the extrusion head 1.

FIG. 1 shows the blow-mold halves 1a, 1b under the extrusion head 1 in the receiving position (the receiving position relates to the tool) and in the feeding position with respect to the extrusion head. This is the starting point of a production cycle/blow-molding cycle. During the entire blow-molding cycle, the feeding frame 3 remains fixed in place under the extrusion head, which could also be displaced into a setting-up position. The preforms 6a, 6b are first extruded to a length which is greater than the height of the respective part-cavity 5a, 5b of the blow-mold halves 1a, 1b. FIGS. 1 and 2 show the desired final length of the preforms 6a, 6b. Once they have reached the intended length, the preforms 6a, 6b may be detached at the extrusion head 1, for example by means of a hot blade or take-over grippers (not represented) with claw-like gripper elements. Then, the sealing frames 4a, 4b are displaced on the feeding frame 3 in the direction of the opened blow-mold halves 1a, 1b, during which the preforms 6a, 6b can either be held and carried along by means of a transfer gripper or be attached to the sealing frames 4a, 4b by means of securing and/or clamping devices that are not represented.

The sealing frames 4a, 4b may be heated/temperature-controlled, but this is not generally necessary.

The extending movement of the sealing frames 4a, 4b is used to press the preforms 6a, 6b against the periphery 7a, 7b of the blow-mold halves 1a, 1b bounding the part-cavities 5a, 5b. During this feeding operation, the blow-mold halves 1a, 1b remain in the opened receiving position fixed in place under the extrusion head 1. After the preforms 6a, 6b are brought to bear against the blow-mold halves 1a, 1b, either the part-cavities 5a, 5b are evacuated through corresponding channels in the blow-mold halves 1a, 1b and/or the preforms 6a, 6b are subjected to pressure by means of the sealing frames 4a, 4b and/or through the sealing frames 4a, 4b in such a way that they are brought to bear against the inner wall of the part-cavities 5a, 5b and thus respectively form shells 8a, 8b. This re-shaping of the preforms 6a, 6b to form shells takes place by using the heat of extrusion, i.e. by using the plasticating energy that was imparted to the polymer during the extrusion.

In the drawings, the sealing frames 4a, 4b are only represented in an idealized and greatly simplified form. As already mentioned above, means for clamping/fixing the preforms 6a, 6b may be provided on the sealing frames.

The operation of re-shaping the preforms 6a, 6b to form shells 8a, 8b is illustrated in particular in FIGS. 5 and 6. After the re-shaping/molding of the preforms 6a, 6b to form shells 8a, 8b, the sealing frames 4a, 4b are disengaged from the blow-mold halves 1a, 1b, i.e. are moved only a little together again. At this stage it should be noted that, in the position shown in FIG. 5, the sealing frames 4a, 4b may have been brought to bear against the blow-mold halves 1a, 1b merely by the action of a force, but it may alternatively be provided to lock the sealing frames 4a, 4b bearing against the blow-mold halves 1a, 1b together with them.

The disengagement of the sealing frames 4a, 4b from the blow-mold halves 1a, 1b allows the blow-mold halves 1a, 1b or the clamping frame with the blow-mold halves 1a, 1b arranged on it to be displaced from the feeding position under the extrusion head 1 into a joining position, i.e. out of the plane of the drawing with respect to FIGS. 7 and 9, whereas the feeding device 2 remains fixed in place under the extrusion head.

This displacing operation is represented in an indicated manner in FIG. 10.

In order to be able to move the sealing frames 4a, 4b together again at the same time or else at a different time, i.e. to be able to move them into the starting position represented in FIG. 1, they first have to be displaced a little in the direction of extrusion, i.e. downward, and then completely toward one another again, as is represented in an indicated manner in FIG. 9. This movement sequence is intended to avoid a collision with the preforms 6a, 6b, emerging continuously from the extrusion head 1.

Such a displacing movement of the sealing frames 4a, 4b is not necessarily required, but ultimately depends on the distance of the extrusion head 1 from the tool. The extrusion head 1 may be arranged higher; the removal and provision of the preforms 6a, 6b in the corresponding position between the blow-mold halves 1a, 1b may equally well be accomplished by means of a transfer gripper, so that a height adjustment of the sealing frames 4a, 4b is not necessary.

While the sealing frames 4a, 4b are moving back into the starting position represented in FIG. 1, the blow-molding tool opened in the receiving position is displaced with the blow-mold halves 1a, 1b, as shown in FIG. 10, into a joining position outside the projection of the extrusion head 1. A joining device 9, which has been loaded with inserts to be brought into the fuel tank in a loading position 10, has already previously been displaced into this joining position. The joining device 9 is already waiting in the joining position, in the loaded state, for the blow-molding tool, which is displaced from the feeding position into the joining position 10, so that the joining device 9 is positioned between the still opened blow-mold halves 1a, 1b.

The apparatus according to the invention may comprise a number of joining devices, which are respectively provided alternately with corresponding inserts in the loading position 10.

The joining of the inserts, which are not represented for the sake of simplicity, may take place either by means of a closing movement of the blow-mold halves 1a, 1b in relation to one another (statically, see FIG. 12) or else dynamically, i.e. by retracting and extending pneumatic cylinders with inserts clamped/attached to them from the approximately central position between the blow-mold halves 1a, 1b.

The joining device 9 comprises a component carrier 11 and receptacles for the inserts arranged on this component carrier. As already mentioned above, the receptacles may be attached to telescopic devices/cylinders that are not designated any more specifically.

Preferably, the joining of the inserts takes place with the blow-mold halves 1a, 1b opened, i.e. dynamically.

After the joining, the joining device is returned from the joining position into the loading position and the blow-mold halves are closed against one another in the joining position, which is also the removal position, so that the shells molded in the part-cavities 5a, 5b are welded to one another, forming a peripheral seam, to form a finished hollow body. Then, the blow-mold halves 1a, 1b are opened while still in the joining position, and the finished article can be removed, for example by means of a removal gripper. Then, the opened blow-mold halves 1a, 1b in the receiving position are displaced back into the feeding position under the extrusion head. The cycle begins once again. A complete cycle may take between 90 and 60 seconds.

DESIGNATIONS

1 Extrusion head
1a, 1b Blow-mold halves
2 Feeding device
3 Feeding frame
4a, 4b Sealing frames
5a, 5b Part-cavities
6a, 6b Preforms
7a, 7b Periphery of the blow-mold halves
8a, 8b Shells
9 Joining device
10 Loading position
11 Component carrier

What is claimed is:

1. A method for producing a hollow body from thermoplastic material, comprising:
   molding at least two sheet-like preforms in web form of thermoplastic material into two complementary shells in a multi-part tool, which in a closed position forms a mold impression, and joining together the shells to form the hollow body, the preforms being brought between the parts of the tool in an opened receiving position of the parts of the tool, and being placed into part-cavities of the parts of the tool in the opened receiving position by applying differential pressure to mold the preforms in the part-cavities into the shells, and the shells being joined together to form the hollow body by closing the parts of the tool to form the mold impression,
   wherein the preforms are molded in the part-cavities while the parts of the tool are located in the opened receiving position, such that the parts of the tool remain fixed in place in the opened receiving position, and the preforms are brought to the parts of the tool while in the opened receiving position, to bear and press against the part-cavities of the tool while sealing, so that the placing of the preforms into the part-cavities of the tool is preformed essentially without any movement of the part-cavities or parts of the tool.

2. The method as claimed in claim 1, wherein the preforms are brought to the parts of the tool, covering the part-cavities, using at least one feeding device.

3. The method as claimed in claim 2, wherein at least parts of the feeding device are displaced in a direction of opening and closing movement of the parts of the tool.

4. The method as claimed in claim 2, wherein, in the opened receiving position of the tools, the feeding device is arranged between the part-cavities.

5. The method as claimed in claim 2, wherein the feeding device comprises at least two pressing elements comprising adjustable frames and/or plates, which are respectively displaced against the parts of the tool forming the part-cavities, with a preform interposed and/or clamped in place.

6. The method as claimed in claim 1, wherein, after the molding of the shells, the tool is displaced from a feeding position into a joining position.

7. The method as claimed in claim 1, wherein at least one insert of the body to be produced is attached to at least one shell before the shells are joined together to form the hollow body.

8. The method as claimed in claim 7, wherein the insert is attached to the shell in a joining position of the parts of the tool, on an inner side of the shell.

9. The method as claimed in claim 7, wherein the insert is welded and/or riveted to the shell.

10. The method as claimed in claim 7, wherein the insert is attached to the shell using a component carrier.

11. The method as claimed in claim 10, wherein the component carrier is displaced or pivoted between a joining position and a loading position.

12. The method as claimed in claim 11, wherein the joining position of the component carrier corresponds approximately to a joining position of the parts of the tool.

13. The method as claimed in claim 7, wherein the parts of the tool are brought into a joining position, such that the component carrier is positioned between the parts of the tool.

14. The method as claimed in claim 7, wherein the component carrier is brought into a joining position before or at the same time as the parts of the tool are brought into a joining position.

15. The method as claimed in claim 6, wherein, in the feeding position, the parts of the tool are arranged under an extrusion head and are brought from this position into a joining position.

16. An apparatus for producing a hollow body from at least two preforms, comprising:
a multi-part blow-molding tool having at least two blow-mold halves, which respectively include at least one part-cavity, a contour of which corresponds approximately to a contour of a shell to be molded,
at least one preform feeding device configured to bring the preforms to bear against the blow-mold halves such that the preforms are drawable into the part-cavities by differential pressure and are moldable in the part-cavities,
wherein the feeding device comprises at least two pressing elements, which are arranged adjustably on a feeding frame,
wherein, in a receiving position of the blow-mold halves, the feeding frame is arranged between the blow-mold halves and the pressing elements of the feeding device are adjustable in a direction of opening and closing movement of the blow-mold halves to bring the preforms to bear against the blow-mold halves.

17. The apparatus as claimed in claim 16, wherein the blow-mold halves are displaceable transversely in the sense of an opening and closing movement and in relation to the feeding frame.

18. The apparatus as claimed in claim 16, wherein the pressing elements are configured to receive and/or clamp the preforms.

19. The apparatus as claimed in claim 16, wherein the feeding device is configured to remove and/or detach the preforms from an extrusion device.

20. The apparatus as claimed in claim 16, comprising at least one joining device for the mounting of at least one insert of the hollow body to be produced on at least one shell.

21. The apparatus as claimed in claim 16, wherein the blow-mold halves are displaceable from a feeding position into a joining position in relation to the feeding device.

22. The apparatus as claimed in claim 16, wherein the feeding frame and/or the pressing elements is/are adjustable in and counter to a direction of weight or in and counter to a direction of extrusion.

23. The apparatus as claimed in claim 20, wherein the joining device comprises at least one component carrier, which is provided with at least one receptacle for an insert.

24. The apparatus as claimed in claim 20, wherein the joining device is displaceable and/or pivotable from a loading position into a joining position.

25. The apparatus as claimed in claim 20, wherein the blow-mold halves, the feeding device and the joining device are arranged on a common machine frame.

* * * * *